(12) United States Patent
Loeffler et al.

(10) Patent No.: US 7,374,509 B2
(45) Date of Patent: May 20, 2008

(54) METHOD FOR CONTROLLING A HYBRID DRIVE OF A VEHICLE

(75) Inventors: Juergen Loeffler, Ludwigsburg (DE); Dieter Hoetzer, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 105 days.

(21) Appl. No.: 10/501,263

(22) PCT Filed: Sep. 7, 2002

(86) PCT No.: PCT/DE02/03341

§ 371 (c)(1),
(2), (4) Date: Jan. 25, 2005

(87) PCT Pub. No.: WO03/059674

PCT Pub. Date: Jul. 24, 2003

(65) Prior Publication Data
US 2005/0130796 A1 Jun. 16, 2005

(30) Foreign Application Priority Data
Jan. 15, 2002 (DE) .............................. 102 01 264

(51) Int. Cl.
*B60W 10/08* (2006.01)
*B60W 10/18* (2006.01)
(52) U.S. Cl. .................... 477/4; 477/183; 477/185; 477/203; 903/930; 903/942; 903/947
(58) Field of Classification Search .................... 477/4, 477/183, 184, 185, 203
See application file for complete search history.

(56) References Cited
U.S. PATENT DOCUMENTS
6,089,677 A 7/2000 Fukumura et al.

6,457,784 B1 * 10/2002 Bohm et al. ................. 303/155
6,459,980 B1 * 10/2002 Tabata et al. .................. 701/70
6,719,076 B1 * 4/2004 Tabata et al. .............. 180/65.7

FOREIGN PATENT DOCUMENTS

| | | |
|---|---|---|
| DE | 196 23 847 | 12/1996 |
| DE | 199 14 428 | 11/2000 |
| DE | 100 26 471 | 1/2001 |
| DE | 100 25 037 | 11/2001 |
| EP | 1 160 119 | 12/2001 |
| JP | 8-085373 | 4/1996 |
| JP | 8-098323 | 4/1996 |
| JP | 11-227592 | 8/1999 |
| JP | 2000-217201 | 8/2000 |
| JP | 2001-136604 | 5/2001 |
| WO | WO 99/46139 | 9/1999 |

* cited by examiner

*Primary Examiner*—Sherry Estremsky
*Assistant Examiner*—Edwin A Young
(74) *Attorney, Agent, or Firm*—Kenyon & Kenyon LLP

(57) ABSTRACT

A method for controlling a hybrid drive of a vehicle is described, the hybrid drive including as propulsion motors an internal combustion engine and at least one electric motor/generator, and the output shafts of the propulsion motors being operatively linkable to a power train of the vehicle. The propulsion motors and an electrically activatable braking system of the vehicle are activated in a coordinated manner as a function of a negative torque request, taking this negative torque request into account.

11 Claims, 3 Drawing Sheets

METHOD FOR CONTROLLING A HYBRID DRIVE OF A VEHICLE

FIELD OF THE INVENTION

The present invention relates to a method for controlling a hybrid drive of a vehicle, the hybrid drive including as propulsion motors an internal combustion engine and at least one electric motor/generator, and the output shafts of the propulsion motors being operatively linkable to a power train of the vehicle.

BACKGROUND INFORMATION

Hybrid drives for vehicles are conventional. In the hybrid drives addressed here, an internal combustion engine is combined with at least one electric motor/generator, so that a plurality of drive sources for the vehicle are available. According to requirements specified by a vehicle driver, the drive sources may optionally feed their driving torque into a power train of the vehicle. This results, in a conventional manner in various drive configuration possibilities, depending on concrete driving situations, which are used in particular to improve driver comfort and to reduce energy use, as well as to reduce pollutant emission.

In hybrid drives for vehicles, serial arrangements, parallel arrangements and mixed arrangements of an internal combustion engine and electric motor/generators are conventional. Depending on the arrangement, the electric motor/generators may be connected to the power train of the engine directly or indirectly. For the operative linkage of the internal combustion engine and/or the electric motor/generators it is conventional to arrange them so that they are operatively linkable with each other using gearing, for example planetary gears and the like, and clutches.

Optimum implementation of a driver's request for propulsion power from the hybrid drive requires coordinated activation of the propulsion motors of the hybrid drive, which is accomplished, as is conventional, by a device known as a control unit. The propulsion motors may be activated on the basis of a setpoint operating state of the hybrid drive to be determined by the control unit. The objective in determining this setpoint operating state is in particular low fuel consumption, dynamic drivability of the vehicle and low pollutant emission.

Furthermore, it is generally conventional to equip vehicles with an electronically activatable braking system, for example an electrohydraulic or electromechanical brake.

SUMMARY

An example embodiment of a method according to the present invention may offer the advantage that by linking the activation of the hybrid drive of a vehicle with the activation of a braking system of the vehicle, optimum utilization of the available power of the vehicle is possible. Because, as a result of a request for negative torque, a coordinated activation of the propulsion machine and of a braking system of the vehicle occurs, which takes this request for negative torque into account, it becomes particularly advantageously possible for braking energy to be recovered taking into account boundary conditions of optimum power consumption, optimum comfort, and optimum safety. In particular, it is possible to lower fuel consumption of the internal combustion engine through recovery of braking energy by feeding it back into the on-board electrical system. The fed-back energy may be stored in particular in a high-performance battery—which is used to supply power to at least one electric motor/generator—and is available to be fed into the on-board electrical system if needed.

BRIEF DESCRIPTION OF THE DRAWINGS

The present invention is explained in greater detail below using an exemplary embodiment on the basis of the figures.

DETAILED DESCRIPTION OF EXAMPLE EMBODIMENTS

Figure 1:
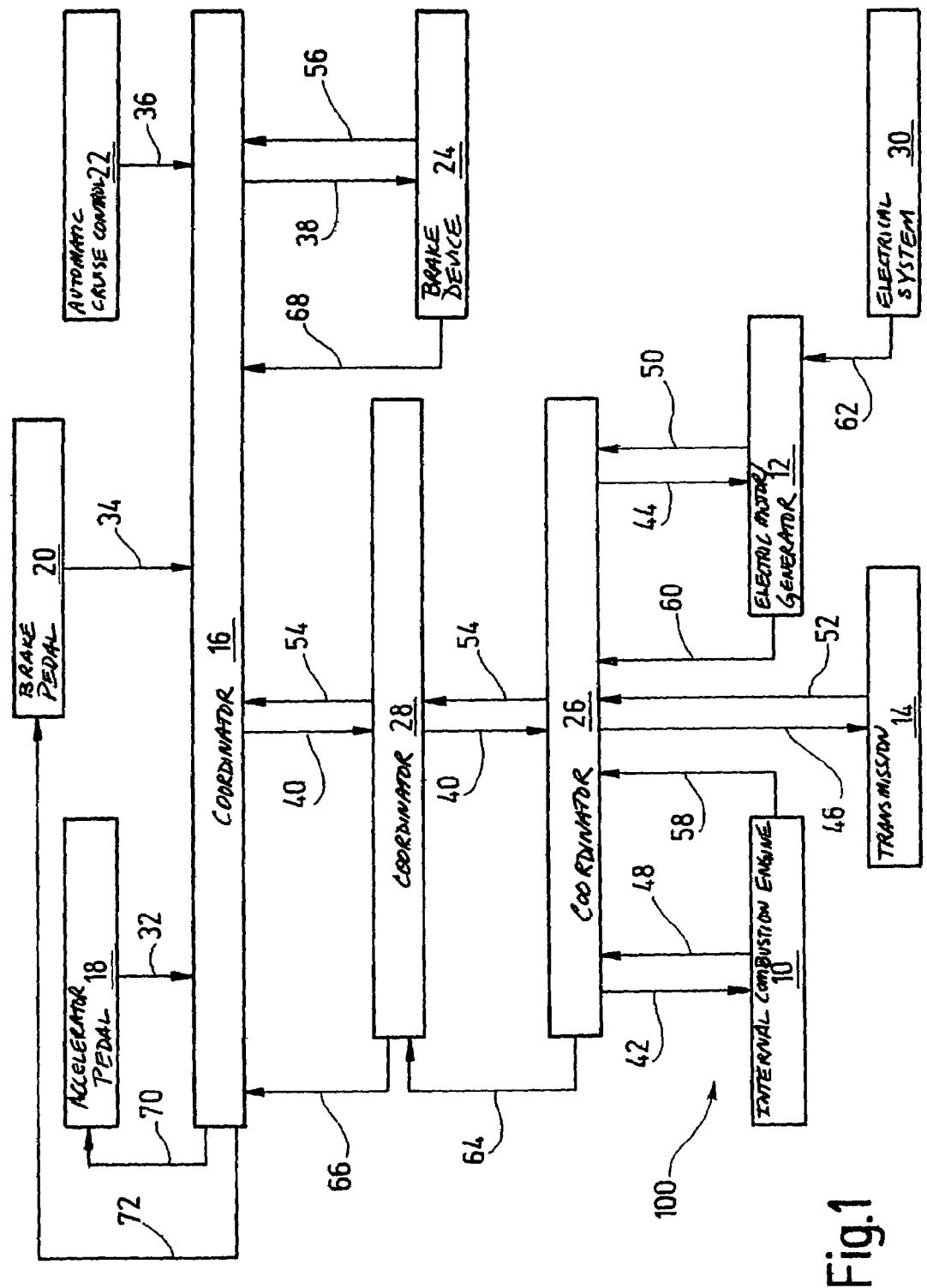
FIG. 1 shows a block diagram of an example method according to the present invention.

FIG. 1 shows a block diagram of a section of a control unit for activating a hybrid drive of a vehicle. Hybrid drive 100 includes an internal combustion engine 10 and at least one electric motor/generator 12. These operate through a transmission 14 on a power train of the vehicle.

The engine control unit includes a device known as a coordinator 16 of longitudinal motions, i.e., in or opposite to an imaginary direction of travel of the vehicle. These longitudinal motions of the vehicle are triggered by a request of a vehicle driver, for example through an accelerator pedal 18 and a brake pedal 20. In addition, a request may be placed on the longitudinal motion of the vehicle by an automatic cruise control system 22. Accelerator pedal 18 and/or brake pedal 20 and/or automatic cruise control system 22 may request an acceleration or deceleration of the vehicle in the longitudinal direction, which is implemented by hybrid drive 100 or a brake device 24 of the vehicle. For coordinated activation of hybrid drive 100, i.e., of the individual components of hybrid drive 100, a device known as a coordinator 26 is provided. Drive coordinator 26 communicates with longitudinal motion coordinator 16 through a vehicle coordinator 28. The vehicle also includes an on-board electrical system 30 to supply electric motor/generator 12 and other electrical components of the vehicle.

From accelerator pedal 18, coordinator 16 receives a signal 32, which requests a setpoint power at the output of transmission 14. From brake pedal 20, coordinator 16 receives a signal 34, which requests a setpoint torque at the wheels of the vehicle. The magnitude of signal 34 relates to the sum of the braking torques at the four wheels of the vehicle, and is thus proportional to a desired braking force that acts on the vehicle in the longitudinal direction. From automatic cruise control system 22, coordinator 16 receives a signal 36 that requests a longitudinal acceleration of the vehicle.

Coordinator 16 evaluates and processes signals 32, 34 and 36, and provides a signal 38 corresponding to the setpoint braking torque that is requested from braking system 24. In addition, a signal 40 is provided by coordinator 16, which corresponds to a setpoint drive power at the output of transmission 14 and is requested by coordinator 26 for hybrid drive 100. Signal 40 is forwarded via coordinator 28 to coordinator 26. Corresponding to signal 40, coordinator 26 is responsible for determining the setpoint operating state of hybrid drive 100 and the resulting activation of propulsion motors 10 and 12.

Propulsion motors 10 and 12 are activated in such a way that the setpoint drive power corresponding to signal 40 is implemented at the output of transmission 14. To this end, coordinator 26 gives internal combustion engine 10 a signal 42 which corresponds to a setpoint output torque of internal combustion engine 10. In addition, coordinator 26 gives a signal 44 to electric motors/generators 12 or, if there are a plurality of electric motors/generators 12, to electric motors/generators 12, which corresponds in each case to the setpoint output torques of electric motors/generators 12. At the same time, transmission 14 receives a signal 46 which corresponds to a setpoint gear or a setpoint transmission ratio of transmission 14.

Internal combustion engine 10 supplies a signal 48 to coordinator 26, which corresponds to the instantaneous engine output torque of internal combustion engine 10. The electric motors/generators deliver instantaneous torque 50. In addition, transmission 14 supplies a signal 52 to coordinator 26 which corresponds to the instantaneous operating state of transmission 14. From signals 48, 50 and 52, coordinator 26 determines the instantaneous transmission output torque and makes it available to coordinator 28 as signal 54. The latter forwards signal 54 to the coordinator for longitudinal motion of the vehicle. From braking system 24, coordinator 16 receives a signal 56 that corresponds to the instantaneous wheel braking torque.

Figure 2:
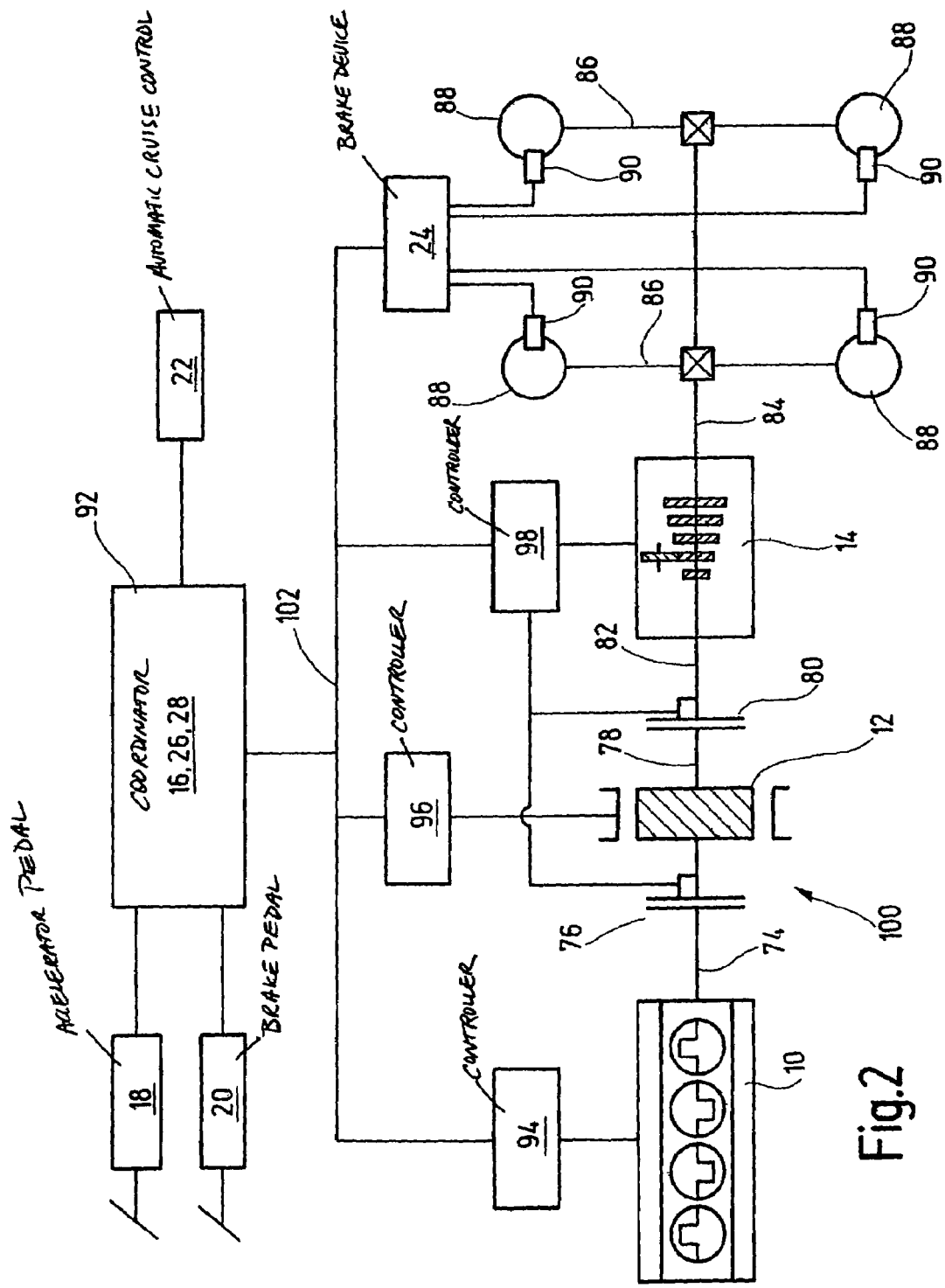
FIG. 2 shows a schematic view of the drive and braking system of a vehicle.

Coordinator 26 receives from internal combustion engine 10 an additional available signal 58, which contains additional operating data about internal combustion engine 10. Internal combustion engine 10 has a maximum and a minimum engine output torque. These torques are variable via the engine speed according to a full load characteristic curve or a drag torque curve, and are a function of additional operating parameters such as engine temperature and the atmospheric air pressure. Furthermore, coordinator 26 receives a signal 60 from electric motor/generator 12. Each electric motor/generator 12 also has a maximum and a minimum output torque, which depends on the rotational speed. The maximum and minimum torques are in addition functions of the temperature of electric motor/generator 12 and of an indirect AC converter (FIG. 2). The potential torques also depend on the state of on-board electrical system 30, in particular a battery charge state and a battery voltage. On-board electrical system 30 transmits its instantaneous potential to electric motor/generator 12 as signal 62, so that this data is also merged into signal 60.

From the data from signals 58 and 60, coordinator 26 determines the torque potential or power potential of hybrid drive 100 at the output of transmission 14. A resulting signal 64 is communicated by coordinator 26 to coordinator 28. In this process, the physical correlations resulting from the constructional arrangement of combustion internal combustion engine 10, electric motor/generators 12 and transmission 14 in particular are also taken into account. Signal 64 also depends on possible operating modes of hybrid drive 100. Examples of possible operating modes are pure internal combustion engine mode, pure electrical mode and hybrid electrical-internal combustion engine mode. For each of these operating modes, a torque or power potential at the output of transmission 14 is determined and is reported to coordinator 28. Signal 64 also depends on the gear selected, i.e., the transmission ratio and on the shifting state of one or more clutches. In addition to the data about the gear currently selected, coordinator 26 also communicates to coordinator 28 the data signals for other possible gears.

Coordinator 28 provides the torque and power potentials of hybrid drive 100 to coordinator 16 as signal 66. In so doing, coordinator 28 takes possible operating modes into account and communicates only the potentials of permitted operating modes.

From braking system 24, coordinator 16 also receives a signal 68 which contains operation-dependent status data about braking system 24. This data may be for example an instantaneous braking force, a braking force gradient, or the like.

On the basis of signals 66 and 68, coordinator 16 supplies a signal 70 to accelerator pedal 18 that specifies the range within which an interpretation of accelerator pedal 18 is possible. In addition, a signal 72 which defines the range within which an interpretation of brake pedal 20 is supposed to take place is fed to brake pedal 70.

Furthermore, coordinator 16 gates signal 34 from brake pedal 20 with signal 54, which corresponds to the instantaneous transmission output torque of hybrid drive 100, and from that determines signal 38 as the specification for the setpoint wheel braking torque of braking system 24.

Thus, the setpoint wheel braking torque (signal 38) is specified taking into account signal 62 supplied by on-board electrical system 30 and the supplied potential data. The latter is gated, via coordinator 26, with the data supplied by internal combustion engine 10, electric motor/generator 12 and transmission 14, so that by conveying the corresponding signals to coordinator 16 it is possible to achieve coordinated activation of hybrid drive 100, i.e., of internal combustion engine 10, electric motor/generator 12 and transmission 14, as well as of braking system 24, so that when braking system 24 is activated or when internal combustion engine 10 is in deceleration mode, optimum recovery of braking energy through deliberate generator operation of electric motor/generator 12 is possible. Through coordinated activation of propulsion motors 10 and 12 and of braking system 24, depending on the demands of brake pedal 20 (signal 34), the negative torque demand (deceleration wish) for the vehicle is optimally met. This largely prevents unnecessary losses.

FIG. 2 shows in a block diagram the implementation of the control of a hybrid drive explained on the basis of FIG. 1. Parts equivalent to those in FIG. 1 are given the same reference symbols and are not explained again. Hybrid drive 100 includes internal combustion internal combustion engine 10, electric motor/generator 12 and transmission 14. A crankshaft 74 of internal combustion engine 10 is operatively linkable to electric motor/generator 12 through a first clutch 76. An output shaft 78 of electric motor/generator 12 is operatively linkable to an input shaft 82 of transmission 14 through a second clutch 80. An output shaft 84 of transmission 14 is operatively linked to drive shafts 86, which drive wheels 88, here indicated schematically. Brake devices 90 indicated here may act on wheels 88. Accelerator pedal 18, brake pedal 20 and automatic cruise control system 22 are connected to a control unit 92, which includes coordinators 16, 26 and 28 illustrated in FIG. 1.

Internal combustion engine 10 is activatable through a controller 94. Electric motor/generator 12 is activatable via an indirect AC converter 96, while transmission 14 and clutches 76 and 80 are activatable via a clutch controller 98. Brake devices 90 are activatable by braking system 24. Control unit 92 is connected to controllers 94, 96, 98 in braking system 24 through a bus system (such as CAN) 102. The exchange of the data streams illustrated in FIG. 1 among the individual components for coordinated activation of internal combustion engine 10, electric motor/generator 12, transmission 14, and braking system 24 takes place via this bus 102. The representation in FIG. 2 makes it clear that the present invention may be easily integrated into existing vehicle structures.

Figure 3:
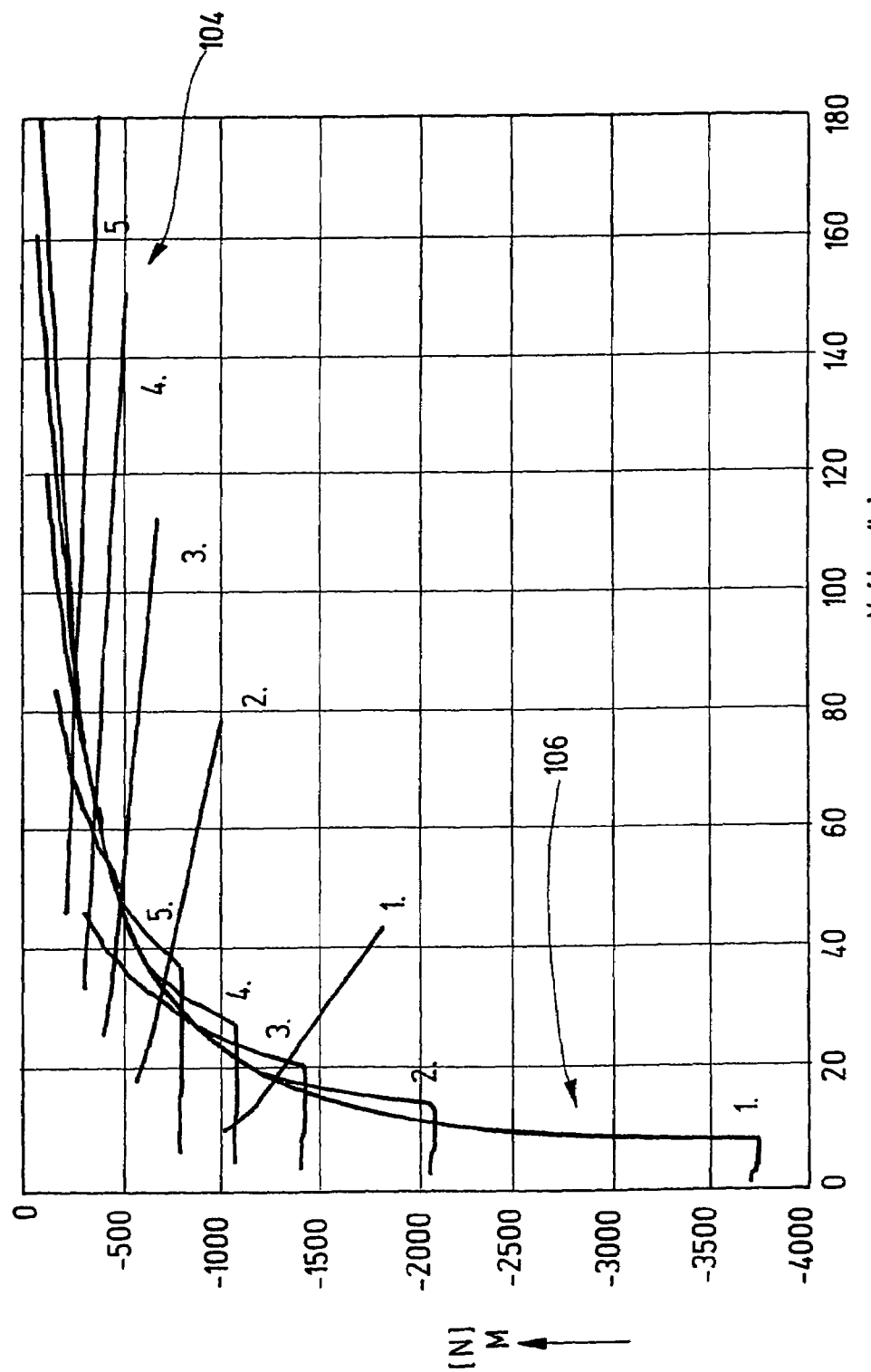
FIG. 3 shows torque characteristic curves of a hybrid drive.

FIG. 3 illustrates via characteristic curves the profile of torque M as a function of a vehicle velocity V. At the same time the range of negative torques, converted to a braking force on the wheel, is shown. The family of curves is based on the assumption of the parallel hybrid drive 100 shown schematically in FIG. 2, having a 5-speed automatic transmission 14, and an electric motor/generator 12, which is positioned between a flywheel of combustion internal combustion engine 10 and transmission input shaft 82 through use of two automatically operable clutches 76 and 80.

FIG. 3 shows for each of the gears, which are designated with 1., 2., 3., 4. and 5., the maximum drag torque of internal combustion engine 10 as characteristic curves 104, and the maximum drag torque of electric motor/generator 12, which corresponds to its minimum torque, as characteristic curve 106. In the pure internal combustion engine mode of hybrid drive 100, the potential is given by the profile of the drag torque of combustion internal combustion engine 10, while in the pure electric mode of hybrid drive 100 the potential is given by the profile of the minimal torque of electric motor/generator 12. In hybrid mode, these two torque characteristics—in reference to the particular gear—may be superimposed, so that the sum of the two curves results as the maximum potential.

What is claimed is:

1. A method for controlling a hybrid drive of a vehicle, the hybrid drive including as propulsion motors an internal combustion engine and at least one electric motor/generator, and output shafts of the propulsion motors being operatively linkable to a power train of the vehicle, the method comprising:

activating the propulsion motors and an electrically activatable braking system of the vehicle in a coordinated manner, as a function of a negative torque demand, and taking the negative torque demand into account;

wherein to specify a setpoint wheel braking torque, an instantaneous transmission output torque signal is gated with a request signal of a brake pedal, wherein the request signal delivered by a brake pedal is interpreted within a range that is defined by operation-related state data of the braking system and instantaneous torque or power potentials of the hybrid drive, and wherein the signal delivered by the brake pedal is processed so that a maximum negative torque of the hybrid drive is assigned to a maximum negative torque demand position of the brake pedal, wherein the signal delivered by the brake pedal is processed so that a minimum negative torque of the hybrid drive is assigned to a minimum negative torque demand position of the brake pedal, and wherein values lying between the maximum and minimum negative torque are assigned to corresponding torque demand positions of the brake pedal.

2. The method as recited in claim 1, further comprising: specifying the setpoint wheel braking torque for the braking system taking an operating state of the hybrid drive into account.

3. The method as recited in claim 1, wherein operating data of the internal combustion engine and of the electric motor/generator are taken into account for torque and power potentials of the hybrid drive.

4. The method as recited in claim 1, wherein an operating state of an on-board electrical system is taken into account for a torque and power potential of the electric motor/generator.

5. The method as recited in claim 4, wherein at least one of a battery state of charge, and a battery voltage is taken into account.

6. The method as recited in claim 1, wherein possible operating modes of the hybrid drive are taken into account for torque and power potentials.

7. The method as recited in claim 1, wherein a selected gear of the transmission is taken into account for torque and power potentials.

8. The method as recited in claim 1, wherein a shifting state of clutches of the hybrid drive is taken into account for torque and power potentials.

9. The method as recited in claim 1, wherein the request signal delivered by the brake pedal is a raw-signal that is processed so that a coordinated activation of the propulsion motors and the electrically activatable braking system of the vehicle occurs.

10. The method as recited in claim 1, wherein operating data of the internal combustion engine and of the electric motor/generator are taken into account for torque and power potentials of the hybrid drive, wherein an operating state of an on-board electrical system is taken into account for a torque and power potential of the electric motor/generator, and wherein at least one of a battery state of charge, and a battery voltage is taken into account.

11. The method as recited in claim 1, wherein possible operating modes of the hybrid drive are taken into account for torque and power potentials, wherein a selected gear of the transmission is taken into account for torque and power potentials, and wherein a shifting state of clutches of the hybrid drive is taken into account for torque and power potentials.

* * * * *